(12) United States Patent
Eck et al.

(10) Patent No.: US 10,386,929 B2
(45) Date of Patent: Aug. 20, 2019

(54) HAPTIC INTERFACE PROVIDING IMPROVED HAPTIC FEEDBACK ESPECIALLY IN THE REPRODUCTION OF A STOP

(71) Applicant: COMMISSARIAT A L'ENERGIE ATOMIQUE ET AUX ENERGIES ALTERNATIVES, Paris (FR)

(72) Inventors: Laurent Eck, Saint Lubin de la Haye (FR); Moustapha Hafez, Arcueil (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 46 days.

(21) Appl. No.: 15/532,433

(22) PCT Filed: Nov. 30, 2015

(86) PCT No.: PCT/EP2015/078088
§ 371 (c)(1),
(2) Date: Jun. 1, 2017

(87) PCT Pub. No.: WO2016/087383
PCT Pub. Date: Jun. 9, 2016

(65) Prior Publication Data
US 2017/0269692 A1   Sep. 21, 2017

(30) Foreign Application Priority Data
Dec. 2, 2014 (FR) ...................................... 14 61796

(51) Int. Cl.
*F16F 9/53* (2006.01)
*G05G 1/08* (2006.01)
(Continued)

(52) U.S. Cl.
CPC .............. *G06F 3/016* (2013.01); *F16F 9/535* (2013.01); *G05G 1/08* (2013.01); *G05G 5/03* (2013.01); *G06F 3/0362* (2013.01)

(58) Field of Classification Search
CPC .. G05G 5/03; G05G 1/08; G06F 3/016; G06F 3/0362; F16F 9/535
See application file for complete search history.

(56) References Cited

U.S. PATENT DOCUMENTS 6,373,465 B2    4/2002 Jolly et al.
2002/0057152 A1*  5/2002 Elferich .................. G05G 1/08
                                                    335/220
(Continued)

FOREIGN PATENT DOCUMENTS

FR      2 930 655 A1    10/2009

OTHER PUBLICATIONS

International Search Report dated Feb. 9, 2016 in PCT/EP2015/078088 filed Nov. 30, 2015.
(Continued)

*Primary Examiner* — Alexander Eisen
*Assistant Examiner* — Kebede T Teshome
(74) *Attorney, Agent, or Firm* — Oblon, McClelland, Maier & Neustadt, L.L.P.

(57) ABSTRACT

A method for generating haptic sensations from a haptic interface including: a rotatable button; an element for interacting with a fluid with a viscosity that varies as a function of an exterior stimulus, the element for interacting with the fluid moving with the button; a fluid with an apparent viscosity that varies as a function of a magnetic field and that surrounds the element for interacting with the fluid; and a system for generating a magnetic field on command in the fluid. The method includes: evaluating a current position of the button; determining a direction of rotation of the button;

(Continued)

altering the value of the current position when the current position is in a haptic stop zone and the direction of rotation of the button is associated with the haptic stop, and as long as the direction of rotation of the button is not modified.

15 Claims, 4 Drawing Sheets (51) Int. Cl.
*G05G 5/03* (2008.04)
*G06F 3/01* (2006.01)
*G06F 3/0362* (2013.01)

(56) References Cited

U.S. PATENT DOCUMENTS

| 2004/0017190 | A1* | 1/2004 | McDearmon | G01D 5/145 |
| | | | | 324/207.25 |
| 2011/0181405 | A1 | 7/2011 | Periquet et al. | |
| 2016/0059122 | A1* | 3/2016 | Ehara | A63F 13/2145 |
| | | | | 463/31 |

OTHER PUBLICATIONS

French Preliminary Search Report dated Aug. 18, 2015 in FR 1461796 filed Dec. 2, 2014.

* cited by examiner

HAPTIC INTERFACE PROVIDING IMPROVED HAPTIC FEEDBACK ESPECIALLY IN THE REPRODUCTION OF A STOP

TECHNICAL FIELD AND STATE OF PRIOR ART

The present invention relates to a haptic interface with an improved haptic feedback, especially in the reproduction of a stop.

A haptic interface can take the form of a rotary button handled by a user, an angular position sensor determines the angular position of the button. In this case, the interface opposes a resisting torque to the user as a function of the angular position of the button and the movement applied by the user, thus enabling haptic patterns which will be felt by the user when he/she rotates the button to be defined.

The resisting torque can be transmitted to the button through a magneto-rheological fluid the apparent viscosity of which is modified by applying a magnetic field in order to define the predefined haptic patterns. In this configuration where the haptic feeling is an angular function of the position of the button, the production of some haptic patterns suffers from undesirable effects which are detrimental to the haptic quality perceived.

For example, in the case where the position sensor detects that the button enters an angular zone defined as a haptic stop, the interface has to reproduce this stop. Thereby, it is necessary to generate a significant resisting torque when the button enters the angular zone defined as a haptic stop. Yet, it is possible that the user forces on the button, i.e. he/she continues to exert a torque on the button, then the angular position of the button will be modified accordingly until it exits from the angular zone defined as a stop. As a result, the virtual stop is crossed. This crossing can also occur by an inertial effect if the zone defined as a stop is too narrow. Yet, if the angular position of the button is modified so as to exit from the angular zone defined as a stop, the angular position sensor will measure an angular position off the zone defined as a stop, then the interface will modify the resisting torque applied which will be no longer necessarily that of a stop. As a result, there is a risk that the torque corresponding to the "stop" pattern is no longer applied to the button and thus of having a poor haptic feedback.

DISCLOSURE OF THE INVENTION

Consequently, one purpose of the present invention is to offer a haptic interface offering an improved haptic feedback, in particular in the case of the reproduction of a stop.

The aforementioned purpose is achieved by a haptic interface comprising a user interacting member and a fluid interacting member the viscosity of the fluid varying as a function of a control stimulus, both members being at least rotationally or at least translationally integral, the user interacting member being able to be moved in a first direction and in a second direction, means for generating a variable stimulus, a position sensor detecting the position of the user interacting element, means for detecting the direction of movement of the user interacting element and/or the direction in which the user intends to move the user interacting element, and a control unit which implements an internal representation of the current position of the button from the information of the position sensor and which, at least when an implemented current position corresponds to a stop zone and when the direction of movement is that associated with the stop zone, generates a command to apply a resisting strain to the fluid interacting member which corresponds to a stop. The control unit preserves this current position value for controlling the means generating the stimulus as long as the direction of movement of the user interacting member remains the direction of movement associated with the stop zone, and implements again a current position value from the information of the position sensor for controlling the means generating the stimulus, when the direction of movement of the user interacting member is the direction opposite to that associated with the stop zone.

In other words, from the signal provided by the position sensor of the button, a variable is implemented which will correspond to the current position of the button considered by the control unit and an impassable stop is created by altering this value of the current position as soon as the current position value corresponds to a stop zone and the movement of the button is in a direction corresponding to the stop. The interface then considers as a signal for controlling the means for generating a resisting strain an altered current position value corresponding to a stop zone as long as the direction of movement of the user interacting member is not modified, and even if the position sensor detects a movement of the button. The control unit uses the signals provided by the position sensor to know the relative position of the button and not its real position.

Indeed, when the user interacting member arrives in a zone defined as a haptic stop in a given direction, for the haptic sensation to be reliable, the user feels a stop as long as he/she does not move in an opposite direction to the user interacting element. Thus, there is no risk that the interface is misled by a forced or unfortunate crossing of the zone defined as a stop.

Thus, by virtue of the invention, the user interacting element can mechanically cross the stop zone but the interface does not see that the user interacting element has exited from the stop zone since the current position of the user interacting element is set to a value which is in the stop zone, the braking strain which is then applied is that corresponding to a stop zone. When the button is moved in the reverse direction, the control unit considers that it has exited from the stop zone.

In a particular example, the fluid implemented is a magneto-rheological fluid and the means generating a stimulus are means generating a variable magnetic field.

Thus, one subject-matter of the present invention is a method for generating haptic sensations from a haptic interface comprising:
- a user interacting element able to be moved in a first direction and in a second direction,
- a fluid interacting element, the viscosity of the fluid varying as a function of an exterior stimulus, the fluid interacting element being at least translationally or at least rotationally integral with the user interacting element,
- a brake comprising a fluid the apparent viscosity of which varies as a function of an exterior stimulus and a generation system for generating said stimulus on command in said fluid, the fluid interacting element being disposed in the fluid,
- means for determining a position of the user interacting element,
- means for determining the movement of the user interacting element or the intent with which the user intends to move the user interacting element, a control unit able to send commands to said system for generating said stimulus, said method comprising the steps of:

a) measuring the position of the user interacting element, b) determining the direction of rotation of the user interacting element or the direction in which the user intends to move the user interacting element, c) evaluating a current position piece of information from the position measurement of the user interacting element, d) if the current position piece of information is in a zone defined as a haptic stop and the direction of rotation of the user interacting element or the direction in which the user intends to move the user interacting element is that associated with the haptic stop, the current position piece of information considered to control the system for generating the stimulus is set to a current position value corresponding to a zone defined as a haptic stop as long as the direction of movement of the user interacting element or the direction in which the user intends to move the user interacting element is not modified, e) if the current position piece of information is in a zone other than a zone defined as a haptic stop, the current position considered to control the system for generating said stimulus is evaluated from the position measurement of the user interacting element, f) generating a command to the system for generating said stimulus based on the current position, g) modifying the viscosity of the fluid.

For example, if the current position is in a zone defined as a haptic stop and the direction of rotation of the user interacting element or the direction in which the user intends to move the user interacting element is that associated with the haptic stop, the value of the current position piece of information considered is evaluated from the measured position as soon as the user interacting element enters a zone defined as a stop zone.

For example, determining the direction of rotation comprises calculating the derivative of the measurement of step a).

In one exemplary embodiment, determining the direction in which the user intends to move the user interacting element comprises the step of detecting the torque exerted by a user on the user interacting element in the case of a rotatably movable user interacting element.

In another exemplary embodiment, determining of the direction in which the user intends to move the user interacting element comprises the step of detecting the strain exerted by a user on the user interacting element, in the case of a translationally movable user interacting element.

When the fluid implemented is a magneto-rheological fluid, step f) comprises applying a magnetic field.

Another subject-matter of the present invention is a haptic interface comprising:

a user interacting element able to be moved in a first direction and in a second direction, a fluid interacting element, the viscosity of the fluid varying as a function of an exterior stimulus, the fluid interacting element being at least translationally or at least rotationally integral with the user interacting element, a brake comprising a fluid the apparent viscosity of which varies as a function of an exterior stimulus and a generation system for generating said stimulus on command in said fluid, the fluid interacting element being disposed in the fluid, means for determining a position of the user interacting element, means for determining the direction of movement of the user interacting element and/or means for determining the direction of movement in which the user intends to move the user interacting element, a control unit able to send commands to said system for generating said stimulus, the control unit comprising means for generating said commands as a function of the position of the user interacting element and the direction of movement of the user interacting element and/or of the direction in which the user intends to move the user interacting element from predefined haptic patterns, the haptic patterns comprising at least one haptic stop defined for a given movement zone and for a given direction of movement, the control unit being such that it evaluates a current position piece of information from the position measurement of the interacting element and such that, if the current position is located in a zone defined as a haptic stop and the direction of movement of the user interacting element is that associated with the haptic stop, the control unit sets the current position piece of information to a current position value corresponding to a zone defined as a haptic stop, designed as a modified current position, as long as the direction of movement of the user interacting element is not modified and generates commands to the system for generating the stimulus based on this modified current position.

The current position value set corresponds for example to the entering zone of the zone defined as a haptic stop.

The means for determining the movement of the user interacting element can comprise means for calculating the derivative of the measurements provided by the means for determining a position of the user interacting element.

In one exemplary embodiment, the means for determining the intent to move the user interacting element comprise means for detecting the torque exerted by a user on the user interacting element, in the case of a rotatably movable user interacting element, or means for detecting the strain exerted by a user on the user interacting element, in the case of a translationally movable user interacting element.

The fluid is advantageously a magneto-rheological fluid, the stimulus being a magnetic field and the commands generated being current intensities.

In one example, the user interacting element is rotatably movable and is integral with a rotating shaft with a longitudinal axis with which the fluid interacting element is integral, the means for measuring the angular position being an angular position sensor.

In another example, the user interacting element is translationally movable.

BRIEF DESCRIPTION OF THE DRAWINGS

The present invention will be better understood based on the description that follows and the appended drawings in which.

DETAILED DISCLOSURE OF PARTICULAR EMBODIMENTS

In the description that follows, the example of a haptic interface with a rotary button will be described in detail, but it will be understood that the invention is also applicable to a cursor-type linear movement haptic interface. Further, the interface described implements a magneto-rheological fluid, i.e. the apparent viscosity of which varies as a function of the magnetic field applied, but the implementation of an electro-rheological fluid, i.e. a fluid the apparent viscosity of which depends on the electric field applied, does not depart from the scope of the present invention.

Figure 1:
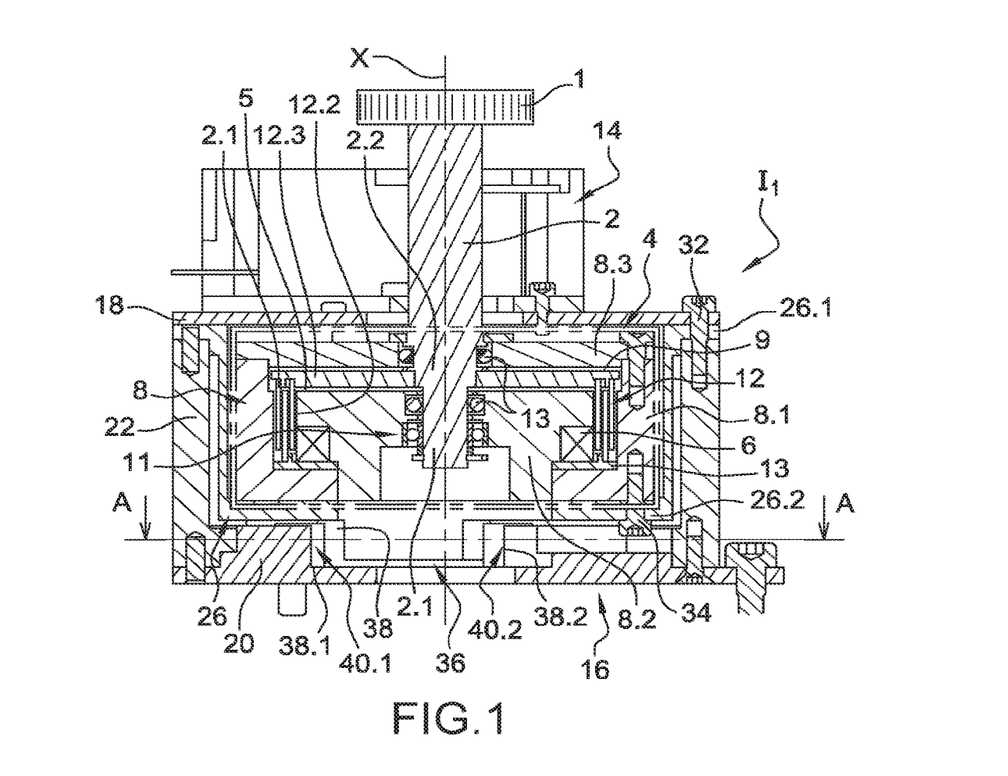
FIG. 1 is a cross-section view of an exemplary embodiment of a rotary haptic interface device that can be implemented in the present invention.

In FIG. 1, a longitudinal cross-section view of an exemplary embodiment of a device D for a rotary haptic interface IH according to the invention can be seen.

Device D comprises an element 1 for being handled by a user and which will be designated as "button" in the following, this button is rotatably integral with a shaft 2 rotatably movable about the axis X, and a device for generating a resisting strain 4 or a magneto-rheological brake restraining the rotation of the shaft 2.

The brake 4 comprises a fluid the characteristics of which can be modified by means of a magnetic field and a system for generating a magnetic field 6, which are received in a casing 8. The fluid is, for example a magneto-rheological liquid. The assembly comprising the casing, the fluid and the system for generating a magnetic field forms a magneto-rheological brake.

The casing 8 delimits a sealed chamber 9 containing the magneto-rheological fluid. All or part of this chamber is subjected to a magnetic field generated by the system 6. The casing 8 comprises a side wall 8.1, a lower bottom 8.2 and an upper bottom 8.3.

The shaft 2 passes through the upper bottom 8.3, passes through the chamber 9 and passes through the lower bottom 8.2. The end 2.1 of the shaft 2, opposite to that bearing the button 1, is housed in the lower bottom of the casing 8 and is rotatably guided by means of a bearing 11 mounted in the lower bottom 8.2. Rings 13, for example O-rings, ensure sealing between the shaft and the lower and upper bottoms.

The casing 8 delimits a sealed chamber confining the magneto-rheological fluid.

The brake 4 also comprises an element 12 rotatably integral with the shaft 2 and housed in the sealed chamber 10. This element is able to interact with the magneto-rheological fluid, the rotation of the element 12 being more or less braked by the magneto-rheological fluid as a function of its apparent viscosity.

In the example represented, the element 12 comprises two concentric side walls 12.1, 12.2 having a circular transverse cross-section integral with a bottom 12.3, which is rotatably integral with the shaft.

As az variant, the element 12 can only comprise one side wall or more than two concentric side walls. Further alternatively, the element 12 could be formed by a disc. On the other hand, the interacting element could comprise openings and/or projecting or hollow portions in order to increase the resistance to the movement.

In the example represented, the lower bottom 8.2 of the casing 8 has a shape such that the internal volume of the sealed chamber 9 has a shape which corresponds to that of the interacting element 12, which enables the amount of fluid necessary to be reduced. In the example represented, a cylindrical element 13 having a circular cross-section integral with the casing is interposed between both side walls 12.1, 12.2, which promotes the shearing effect of the magneto-rheological fluid when the side walls 12.1 and 12.2 are rotating.

The side walls 12.1, 12.2 of the element 12 can be of a magnetic or non-magnetic material.

In the example represented, the system 6 for generating a variable magnetic field comprises a coil attached to the casing and disposed inside the interacting element 12, and a current supply (not represented) controlled by a control unit as a function of the handling of the button and the prerecorded patterns.

Figure 2:
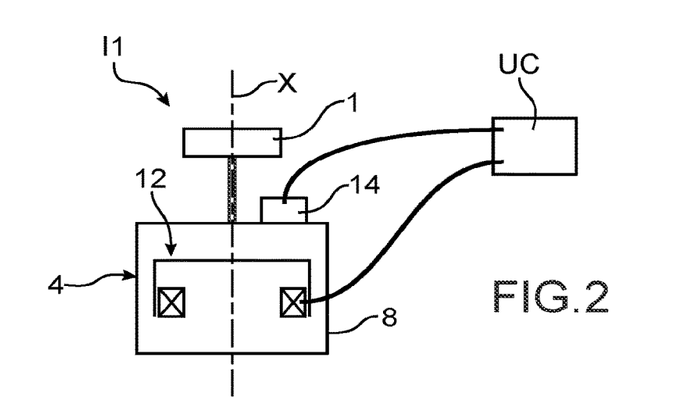
FIG. 2 is a schematic representation of a rotary interface implementing the present invention.

The haptic interface, schematically represented in FIG. 2, comprises device D, a position sensor 14 for the user interacting element, which is, in the example represented, located outside the casing and partly integral with the shaft 2 and housed in a cavity formed in the lower bottom 8.2 of the casing. The position sensor 14 enables the control unit to calculate the current position of the button, which is in the example represented the current angular position. The position sensor 14 can be a relative position sensor such as an incremental optical coder or an absolute position sensor, but it will be seen in the following that the knowledge of the absolute position of the button does not intervene in the algorithms. In the example represented, the device also comprises a housing 16 in which the casing 8 is disposed. The housing 16 comprises a first and a second end flange 18, 20 and a side wall 22 attached to both flanges 18, 20, the rotary shaft passing through the first flange 18. The position sensor 14 is attached to the first flange of the housing.

The interface also comprises a control unit CU for generating commands to said system for generating a magnetic field based on the information provided by the position sensor such that it applies the values of the pattern to be reproduced.

Figure 3:
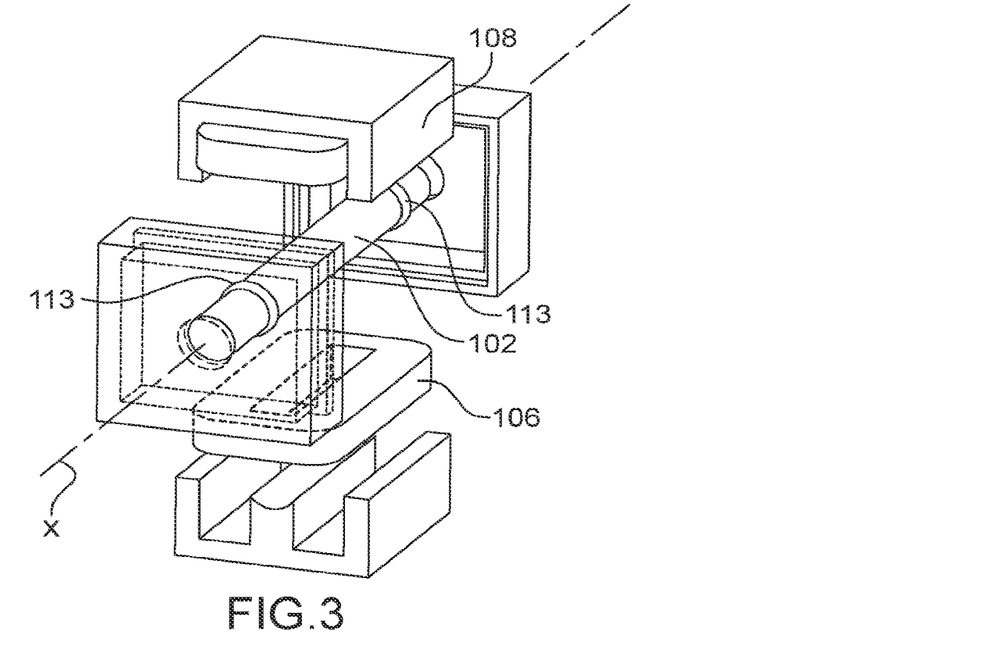
FIG. 3 is a schematic representation of an exemplary embodiment of a linear haptic interface device that can be implemented in the present invention.

In FIG. 3, an example schematically represented of a device able to be implemented in a linear interface according to the invention can be seen in an exploded view.

The device comprises a casing 108 in which an axis 102 is mounted axially movable along its axis X, the axis 102 being intended to carry a user interacting element (not represented) at least one of its longitudinal ends, means 106 for generating a variable magnetic field are disposed in the casing. The casing delimits a sealed chamber which contains magneto-rheological fluid and through which the axis 102 passes. Seals 113 ensure sealed sliding of the shaft in the chamber.

The interface also comprises a position sensor (not represented) enabling the current longitudinal position of the axis 102 to be measured.

The brake is for exerting a resisting strain restraining the movement of the user interacting element. This resisting strain is determined from predefined haptic patterns as a function of the haptic feedback desired to be reproduced, these patterns being recorded in a database.

A pattern is defined by a braking strain to apply as a function of the following data:
the current angular position of the button,
the current direction of rotation of the button.

A haptic pattern is thus an assembly of braking strain values to be applied to the button, i.e. an assembly of values defining the pattern, each value of the haptic pattern being associated with a given angular position of the button and to a direction of rotation of the button. Each braking strain value corresponds to an apparent viscosity value which corresponds to a magnetic field value which corresponds to a current intensity supplying the system generating the magnetic field, for example a coil.

It will be understood that the same pattern value can be affected for different angular positions, or several different linear positions in the case of a linear interface.

A virtual stop is defined by a haptic pattern having preferably a strong amplitude, i.e. for which a very high braking strain is applied to the fluid interacting element in order to stop the movement of the button in a given direction. The virtual stop is defined by an angular zone in which the haptic pattern is to be applied and by a given direction of rotation of the button.

In the present case, the cases where the position sensor detects that the button enters a zone defined as a haptic stop and where the user continues to apply a strain acting against the stop will be especially considered.

The control unit CU uses the information from the angular position sensor to determine the resisting torque that the brake has to generate.

The parameters used are the following ones:

The parameter VIRTUAL_STOP_ZONE defines an angular zone as an angular zone forming a haptic stop.

The parameter STOP_DIRECTION defines that the angular zone defined as a VIRTUAL_STOP_ZONE is actually a stop when the button is moved in a given direction which is STOP_DIRECTION. When the button is moved in the opposite direction, the button moves away from the stop.

The variables used are the following ones:

The variable BUTTON_DIRECTION is the direction of rotation of the button.

The variable CURRENT_BUTTON_POSITION is a button position value implemented by the control unit from the information of the position sensor. The implementation of the value of the variable CURRENT_BUTTON_POSITION is made from variations in the button position, regardless of whether they are positive or negative.

The indicator CURRENT_BUTTON_POSITION_MEMORY is either empty, or contains the variable CURRENT_BUTTON_POSITION which is equal to a position value located in the zone VIRTUAL_STOP_ZONE.

Preferentially, the parameter VIRTUAL_STOP_ZONE can be defined as being the assembly of the braking values of a haptic pattern which are higher than a predetermined threshold and which ensure simulating a stop sensation. In a similar way, the parameter STOP_DIRECTION can be associated with the direction affected to the assembly of the braking values of a haptic pattern which are higher than a predetermined threshold and which forms the parameter VIRTUAL_STOP_ZONE.

The control unit is for emitting commands to the means for generating the magnetic field based on the information provided by the button position sensor and algorithms which are implemented by electronic means of the control unit. The algorithms are the following ones.

The first algorithm AL1 applied is the following one:

During one step, a value implemented from the information provided by the angular position sensor is affected to the variable CURRENT_BUTTON_POSITION.

During another step, a value representing the direction in which the button is rotated is affected to the BUTTON_DIRECTION variable. For example, this value is set from the time derivative of the information provided by the angular position sensor.

During a following step, it is checked whether the value of the variable CURRENT_BUTTON_POSITION is located in an angular zone which is defined as a stop: VIRTUAL_STOP_ZONE. It is also checked whether the variable BUTTON_DIRECTION is equal to the condition STOP_DIRECTION. As explained above, both these conditions should be met for the control unit to decide that the button is in a stop zone.

If both these conditions are met, a stop has to be simulated. The control unit decides that the button is at a stop. Then, during a following step, if the indicator CURRENT_BUTTON_POSITION_MEMORY is empty, the value of the variable CURRENT_BUTTON_POSITION is affected to this indicator, i.e. CURRENT_BUTTON_POSITION_MEMORY=CURRENT_BUTTON_POSITION. That is the end of the first algorithm.

If at least one of these two conditions above is not met, a first stop does not have to be simulated. The control unit decides that the button is not at a stop. If the indicator CURRENT_BUTTON_POSITION_MEMORY is empty, it remains empty. Otherwise, it cancels the value which was affected thereto.

Then, a second algorithm AL2 is applied.

During a first step, it is checked whether the indicator CURRENT_BUTTON_POSITION_MEMORY contains a value.

If so, then the variable CURRENT_BUTTON_POSITION takes the value of the indicator CURRENT_BUTTON_POSITION_MEMORY, i.e. CURRENT_BUTTON_POSITION=CURRENT_BUTTON_POSITION_MEMORY. Thus, the control unit will consider, to generate the command to be sent to the means generating the magnetic field, a current position value which is recorded as a stop and which has to trigger the application of a high resistance to the button and thus the generation of a magnetic field such that the apparent viscosity of the magneto-rheological fluid applies to the fluid interacting element a sufficient resisting torque to simulate a stop. That will be explained in connection with the third algorithm. The current position value, which is recorded as a stop, can for example correspond to the zone entering position defined as a haptic stop.

That is the end of the second algorithm.

If the indicator CURRENT_BUTTON_POSITION_MEMORY does not contain a value, that is the end of the second algorithm. That means that no stop is to be simulated.

Then, a third algorithm AL3 which will determine the braking strain to be applied is applied.

During a first step, the direction of movement of the button is taken into account.

If the variable BUTTON_DIRECTION corresponds to a strictly positive direction of movement, then the control unit generates a command to apply the braking strain as defined for the positive direction and for the position determined by CURRENT_BUTTON_POSITION.

Otherwise, if the variable BUTTON_DIRECTION corresponds to a strictly negative direction of movement, then the control unit generates a command to apply the braking strain as defined for the negative direction and for the position determined by CURRENT_BUTTON_POSITION.

In the case where the button is in a stop zone and is moved in a direction defined as that of the stop, since the value of the variable CURRENT_BUTTON_POSITION has been altered by algorithm AL2 and is artificially set equal to the indicator BUTTON_POSITION_MEMORY which is equal to a position value defined as a stop, even if the button is physically exited from the stop zone because of the user insistence or inertia, the control unit will generate a command to apply a strain corresponding to a stop and thus to generate a magnetic field causing sufficient increase in the viscosity of the magneto-rheological fluid.

Otherwise, i.e. if the variable BUTTON_DIRECTION is zero, that is that the button is not moved, the command not to apply a strain is generated.

If, whereas a stop has been simulated, a change in direction of movement of the button is detected, i.e. it is detected when the variable BUTTON_DIRECTION is different from that defined as a stop, then one of the two aforementioned conditions is no longer met. A variable CURRENT_BUTTON_POSITION which does not correspond to a stop zone is implemented. The control unit will consider this value of CURRENT_BUTTON_POSITION to generate the command to send to the means generating the magnetic field, a current position value which has to trigger applying a given resistance or no resistance.

The modification in the information on the angular position of the button is preferentially made by fulfilling the periodical sequence of algorithms AL1, AL2, AL3.

It will be understood that according to the invention, it is contemplated to alter the value of the variable CURRENT_BUTTON_POSITION, however the real information provided by the position sensor in particular when they enable the direction of rotation of the button to be known, continues to be taken into account by the control unit.

It will be understood that a value of the variable CURRENT_BUTTON_POSITION is not affected to a given real position of the button, but that it is implemented based on the measurement of the relative movement of the button. For example, a real angular zone which corresponds to a stop at a given instant cannot correspond anymore to a stop zone at another instant because the location of the virtual stop zone is re-determined as a function of the angular position where the button has exited from the stop, because it exits from the stop zone as soon as the direction of movement is reversed even if it would be in the middle of the stop zone, the user having for example forced on the button.

It will be also understood that it is the value of the variable CURRENT_BUTTON_POSITION that is provided back to an external application using the rotary button and not the real value given by the position sensor. Thus, the user application thinks that the rotary button remains blocked to the stop, which is consistent with the strain sensation due to the stop felt by the user.

In the example described in a preferred manner, the alteration of the button position is made with computing means, affecting a fixed value to the variable CURRENT_BUTTON_POSITION. But it can be contemplated to mechanically alter the operation of the position sensor to result in a similar result.

The determination of the direction of rotation has been made by deriving the information of the position sensor, but the direction of rotation could be determined in a different way, for example by using a piece of information about the direction of the torque exerted by the user on the button, as will be described below in determining the "action intent" of the user.

In the example described, the control unit takes the direction in which the button is actually rotated into account by detecting this movement. But the action intent of the user to rotate the button can be taken into account. Then, the piece of information about the direction of rotation can be advantageously detected at an early stage which enables the haptic feedback to be improved. This determination of the action intent of the user can be made by measuring the force exerted on the button thanks to the deformation of an interface element, that is the measurement of a torque in the case of a rotary button.

The determination of the action intent of the user also enables the sticking effect to be reduced when the button goes away from a zone defined as a stop.

Figure 4:
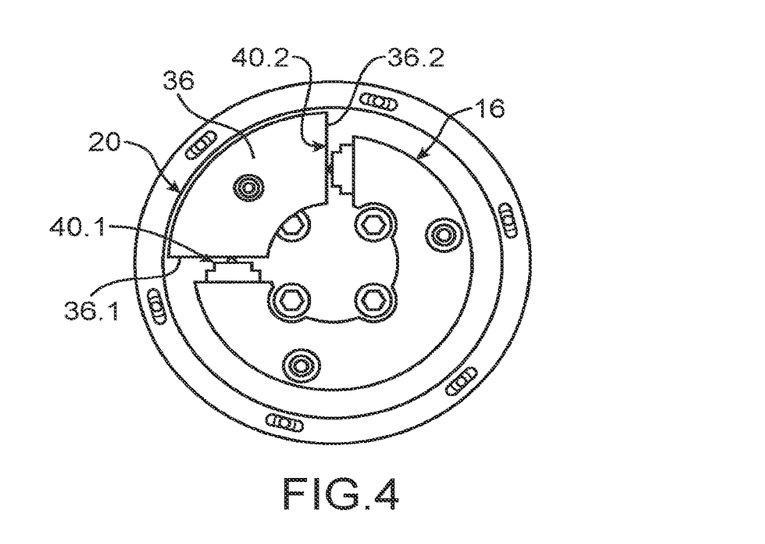
FIG. 4 is a transverse cross-section view along plane A-A of the interface of FIG. 1.
Figure 5:
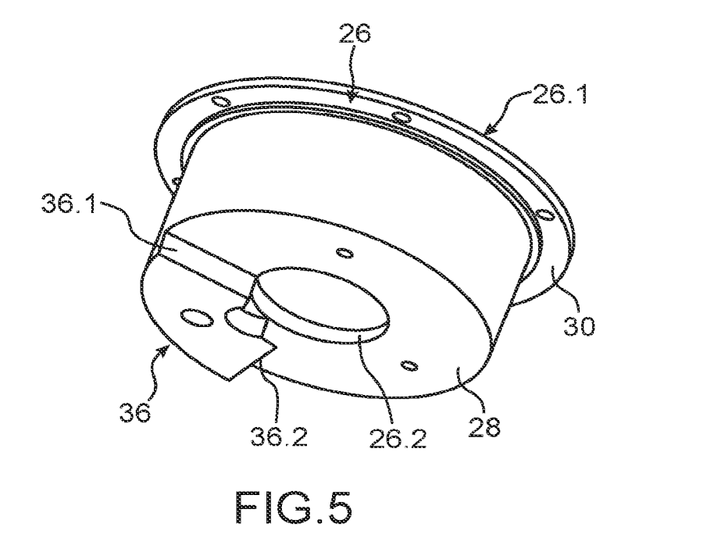
FIG. 5 is a perspective view of an exemplary embodiment of a proof body implemented in the interface of FIG. 1.

In the example represented in FIG. 1 and in FIGS. 4 and 5, such a system is implemented, it comprises a proof body 26 whose deformation caused by the torque applied by the user with strain sensors will be detected. The proof body is represented alone in FIG. 5. The proof body 26 is attached by a longitudinal end 26.1 to the housing 16 and by the other longitudinal end 26.2 to the magneto-rheological brake, to the casing 8 in the example represented. The strain sensors are contacting the proof body at its longitudinal end 26.2 secured to the casing 8.

In the example represented in FIGS. 1, 4 and 5, the proof body 26 comprises a cylindrical shaped body with a circular cross-section closed by a bottom 28 at the longitudinal end 26.2. An annular collar 30 extends radially outwardly at the other longitudinal end 26.1.

The internal diameter of the proof body corresponds to the external diameter of the casing 8, in addition to a backlash. The bottom of the proof body is disposed between the casing and the second flange 20 of the housing 16.

The proof body is secured to the housing by means of at least one screw 32 passing through the flange 18 and the collar 30. In the example represented, the screws 32 are also used to connect the flange 18 to the side wall 28.

The bottom 28 of the proof body is attached to the casing 8 by at least one screw 34.

The proof body 26 also comprises an element 36 projecting from its longitudinal end 26.2 opposite to that in contact with the casing. The element 36 is received in a cavity 38 provided in the flange 20 of the housing.

In the example represented, the projecting element 36 is in the form of an angular portion centred to the longitudinal axis. The angular portion 36 is delimited by two faces 36.1, 36.2. The cavity 38 has a shape corresponding to that of the angular portion 36 and is delimited by two faces 38.1 38.2 each facing a face 36.1, 36.2 of the angular portion 36. A strain sensor 40.1 is mounted to the face 38.1 of the cavity in contact with the face 36.1 of the angular portion and a strain sensor 40.2 is mounted to the face 38.2 of the cavity contacting the face 36.2 of the angular portion 36. A point type mechanical contact is ensured between each strain sensor 40.1, 40.2 and the proof body 26. The strain sensors 40.1, 40.2 are advantageously mounted pre-stressed.

Thus, when a torque is applied to the button, that causes a torsional deformation of the proof body 26 through the casing 8 itself interacting with the fluid, itself interacting with the interacting element 12, itself connected to the shaft 2. This deformation is detected by either of the strain sensors 40.1, 40.2 along the direction of rotation of the button.

The proof body is for example of a plastic material, such as ABS.

The material of the proof body and its geometry can be determined depending on the minimum torque and maximum torque applied, on the sensitivity of the strain sensors and the detection threshold desired. Further, the deformation of the proof body is such that it is not perceptible by the user.

For example, it can be considered that a deformation of the proof body of a few microns is not perceptible by the user.

Alternatively, strains could be measured directly on the casing 8 or the rotary shaft, for that a torque sensor should be implemented. However, a torque sensor has a high cost and a significant bulk with respect to the force sensors. On the other hand, a torque sensor provides an accurate and calibrated torque value whereas this piece of information is not useful within the scope of the invention.

The strain sensor is for example made using piezoresistive elements assembled as a Wheatstone bridge, they allow a sensitivity in the order of a few tens of mV per Newton with a sufficiently high stiffness to limit the movement to a few tens of microns at full load. As a variant, the strain sensor(s) could be replaced by one or more deformation sensors formed, for example, by strain gauges directly applied to the proof body to detect its deformation.

Figure 6:
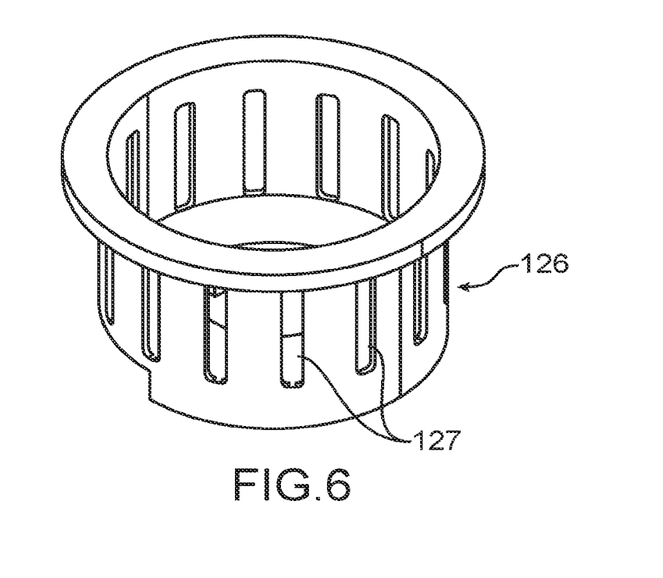
FIG. 6 is a perspective view of another exemplary embodiment of a proof body that can be implemented in the interface of FIG. 1.
Figure 7:
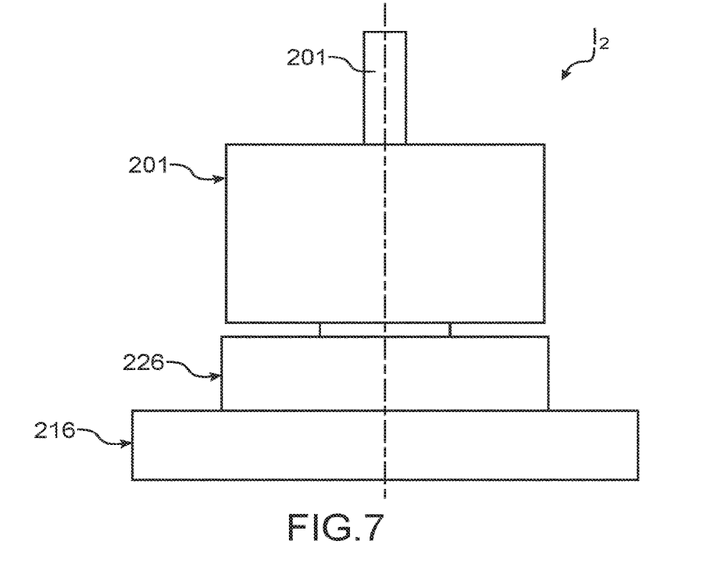
FIG. 7 is a side view of another exemplary haptic interface.
Figure 8A:
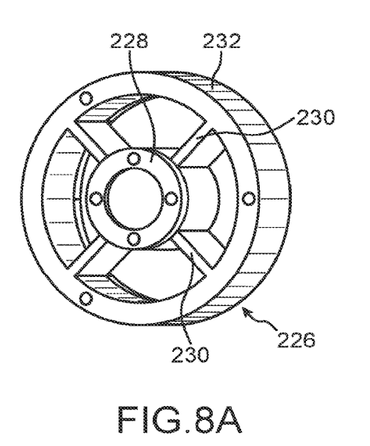
FIGS. 8A to 8C are different views of the proof body implemented in the interface of FIG. 7.
Figure 8B:
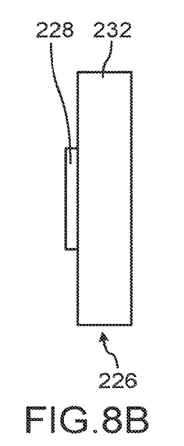
Figure 8C:
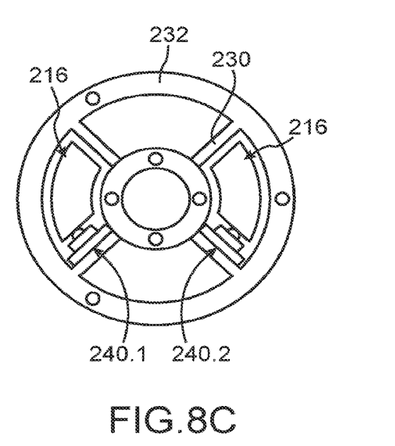

In FIG. 6, another example of a proof body 126 can be seen, the general shape of which is identical to that of the proof body 26, but further comprises longitudinal openings 127 in the side wall of the proof body 126. Preferably, the openings 127 are angularly evenly distributed. The proof body has in this embodiment a greater deformability. It is for example made of an aluminium alloy.

Openings tilted with respect to the longitudinal axis and/or having a shape other than rectilinear for example a bent shape do not depart from the scope of the present invention. On the other hand, not all the openings have necessarily the same dimensions.

Advantageously, means can be provided to amplify the deformation of the proof body under an axial torsion stress while reducing the deformation of the proof body for any other irrelevant stress within the scope of the invention, as for example a radial stress which will be applied to the button in a parasitic way by the user. The detection sensitivity is thus improved and the disturbances or wrong detections can be removed.

The exemplary proof body of FIGS. 1, 4 to 6 enables the sensitivity of the measurement device to be increased by having sensors on an as greater as possible diameter.

In the example represented and advantageously, the walls 36.1 and 36.2 of the projecting element are disposed 90° apart from to each other. This positioning associated with a point contact at the strain sensors 40.1 and 40.2 enables the deformation strain of the proof body to be decomposed and the sensitivity to strains along two orthogonal components located in the plane of the housing 16 to be favoured. Thus, for example, the sensitivity is strongly reduced for parasitic strains exerted perpendicularly to the plane of the housing 16. Furthermore, a computing or algorithmic processing on the orthogonal force components measured by the sensors 40.1 and 40.2, as for example a calculation based on the measurement difference between both sensors which is weighted by the measurement common component of both sensors in the case of a preferential assembly of the sensors with a load pre-stress, enables to some extent the sensitivity to parasitic strains exerted in parallel with the plane of the housing 16 to be reduced.

In FIGS. 7 and 8A to 8C, another examplary embodiment of an interface 12 according to the invention can be seen, comprising a housing 216, a brake 204, a proof body 226 having the form of a wheel and a user interacting element 201, the fluid interacting element being not visible.

The wheel comprises a hub 228, an external ring 232 and spokes 230 connecting the hub 228 to the external ring 232.

In this example, the hub 228 is secured to the casing of the interface for example by screws axially passing through the hub 228 and the external ring 232 is secured to the housing for example by screws axially passing through the external ring.

Two strain sensors 240.1, 240.2 are disposed each bearing against a spoke 230 and disposed with respect to the spokes such that, when the proof body 226 is biased in a direction of rotation, only one of the sensors is biased. The strain sensors are attached to the housing 216 and bears against a face of a spoke 230. Alternatively, the strain sensors could be assembled with a load pre-stress, or, as has been mentioned above, be replaced by elongation gauges disposed on the proof body and detecting the deformation for example of the spokes under the effect of a torsional torque. More generally, the strain sensors could be replaced by deformation sensors.

Means enabling mechanical stresses to be applied to the proof body, as rotational or translational guiding means, can advantageously be added, which enables the number of force sensors to be reduced by assembling the latter with a load pre-stress.

Data from these force of deformation sensors is processed by an electronic system in order to determine whether the torque exerted by the user on the interface exceeds a predetermined threshold. The torque sign is also determined and enables the direction in which the user intends to move the button to be known.

Algorithms AL1, AL2 and AL3 use the knowledge of the direction in which the user intends to move the button in place of the variable BUTTON_DIRECTION.

The operation of the interface is similar to that of the interface by considering the direction of rotation of the button described above.

Advantageously, the interface uses the information about the direction of rotation and the action intent of the user to generate a haptic stop.

It will be understood that means for detecting the action intent of the user applied to a linear translation movement device, for example such as that represented in FIG. 3, does not depart from the scope of the present invention.

The invention thus enables a braking torque defined for making a virtual stop to be maintained even if the user voluntarily or involuntarily exits from the zone defined as a virtual stop. Preferably, the processing of the button position is integrated to the button, so as not to implement an external software or hardware application using the rotary haptic interface (virtual reality software, games, graphic IHM, . . . ), which enables processing times to be reduced and haptic quality felt to be improved.

The invention claimed is:

1. A method for generating haptic sensations from a haptic interface including:
   a user interacting element configured to be moved in a first direction and in a second direction,
   a fluid interacting element interacting with a fluid with a viscosity that varies as a function of an exterior stimulus, the fluid interacting element being at least translationally or at least rotationally integral with the user interacting element,
   a brake including a fluid with an apparent viscosity that varies as a function of an exterior stimulus and a generation system to generate the stimulus on command in the fluid, the fluid interacting element being disposed in the fluid,
   at least one position sensor to determine a position of the user interacting element,
   at least one movement sensor to determine movement of the user interacting element and/or at least one intent sensor to determine an intent with which a user intends to move the user interacting element, and processing circuitry configured to send commands to the generation system to generate the stimulus, the method comprising:

a) measuring a position of the user interacting element;

b) determining a direction of rotation of the user interacting element or a direction in which the user intends to move the user interacting element;

c) evaluating a current position piece of information from the position measurement of the user interacting element;

d) when the current position piece of information is in a zone defined as a haptic stop and the direction of rotation of the user interacting element or the direction in which the user intends to move the user interacting element is that associated with the haptic stop, setting the current position considered to control the generation system to a current position value corresponding to a zone defined as a haptic stop as long as the direction of movement of the user interacting element or the direction in which the user intends to move the user interacting element is not modified;

e) when the current position piece of information is in a zone other than a zone defined as a haptic stop, evaluating the current position considered to control the generation system from the position measurement of the user interacting element;

f) generating a command to the generation system based on the current position; and g) modifying viscosity of the fluid.

2. The method for generating haptic sensations according to claim 1, wherein when the current position piece of information is in a zone defined as a haptic stop and the direction of rotation of the user interacting element or the direction in which the user intends to move the user interacting element is that associated with the haptic stop, setting the current position considered to a current position value corresponding to a position of the user interacting element when it enters in a zone defined as a haptic stop zone.

3. The method for generating haptic sensations according to claim 1, wherein the current position value set corresponds to a zone entering position defined as a haptic stop.

4. The method for generating haptic sensations according to claim 1, wherein the determining the direction of rotation comprises calculating the derivative of the measurement of a).

5. The method for generating haptic sensations according to claim 1, wherein the determining the direction in which the user intends to move the user interacting element comprises detecting torque exerted by a user on the user interacting element in a case of a rotatably movable user interacting element.

6. The method for generating haptic sensations according to claim 1, wherein the determining the direction in which the user intends to move the user interacting element comprises detecting strain exerted by a user on the user interacting element, in a case of a translationally movable user interacting element.

7. The method for generating haptic sensations according to claim 1, wherein, when the fluid implemented is a magneto-rheological fluid, f) comprises applying a magnetic field.

8. A haptic interface comprising:

a user interacting element configured to be moved in a first direction and in a second direction;

a fluid interacting element interacting with a fluid with a viscosity that varies as a function of an exterior stimulus, the fluid interacting element being at least translationally or at least rotationally integral with the user interacting element;

a brake comprising a fluid with an apparent viscosity that varies as a function of an exterior stimulus and a generation system to generate the stimulus on command in the fluid, the fluid interacting element being disposed in the fluid;

at least one position sensor to determine a position of the user interacting element;

at least one movement sensor to determine a direction of movement of the user interacting element and/or at least one intent sensor to determine a direction of movement in which the user intends to move the user interacting element; and processing circuitry configured to send commands to the generation system, the processing circuitry being configured to generate the commands as a function of the position of the user interacting element and the direction of movement of the user interacting element and/or of the direction in which the user intends to move the user interacting element from predefined haptic patterns, the haptic patterns comprising at least one haptic stop defined for a given movement zone and for a given direction of movement, the processing circuitry being further configured to evaluate a current position piece of information from the position measurement of the interacting element and such that, when the current position piece of information is located in a zone defined as a haptic stop and the direction of movement of the user interacting element is that associated with the haptic stop, the processing circuitry sets the current position to a current position value corresponding to a zone defined as a haptic stop, designed as a modified current position, as long as the direction of movement of the user interacting element is not modified and generates commands to the generation system to generate the stimulus based on this modified current position.

9. The haptic interface according to claim 8, wherein the current position considered is set by the processing circuitry to a current position value corresponding to a position of the user interacting element when it enters a zone defined as a haptic stop zone.

10. The haptic interface according to claim 8, wherein the at least one movement sensor comprises a calculator to calculate derivative of measurements provided by the at least one position sensor.

11. The haptic interface according to claim 8, wherein the at least one intent sensor comprises a torque sensor to detect torque exerted by a user on the user interacting element, in a case of a rotatably movable user interacting element, or a strain sensor to detect strain exerted by a user on the user interacting element, in a case of a translationally movable user interacting element.

12. The haptic interface according to claim 8, wherein the fluid is a magneto-rheological fluid, the stimulus being a magnetic field, and wherein the commands generated are current intensities.

13. The haptic interface according to claim 8, wherein the user interacting element is rotatably movable and is integral with a rotating shaft with a longitudinal axis with which the fluid interacting element is integral, the position sensor being an angular position sensor.

14. The haptic interface according to claim 9, wherein the user interacting element is rotatably movable and is integral with a rotating shaft with a longitudinal axis with which the fluid interacting element is integral, the position sensor being an angular position sensor.

15. The haptic interface according to claim 8, wherein the user interacting element is translationally movable.

* * * * *